United States Patent [19]

Offenbroich

[11] Patent Number: 4,893,959

[45] Date of Patent: Jan. 16, 1990

[54] CONNECTOR

[75] Inventor: Adrian G. Offenbroich, Düsseldorf, Fed. Rep. of Germany

[73] Assignee: Foga EHT-System AB, Malmo, Sweden

[21] Appl. No.: 203,104

[22] Filed: Jun. 7, 1988

[30] Foreign Application Priority Data

Jun. 10, 1987 [SE] Sweden .................. 8702398-2

[51] Int. Cl.$^4$ ................................. F16B 7/08
[52] U.S. Cl. ..................... 403/12; 403/255; 403/231
[58] Field of Search .......... 403/252, 254, 255, 406.1, 403/231, 12

[56] References Cited

U.S. PATENT DOCUMENTS 3,672,710 6/1972 Kroop ..................... 403/255 X
4,641,983 2/1987 Strassle ................... 403/235 X

FOREIGN PATENT DOCUMENTS 0004374 3/1979 European Pat. Off. .
2812502 9/1979 Fed. Rep. of Germany ...... 403/255
501789 1/1971 Switzerland .
525346 6/1972 Switzerland .
WO84/01801 10/1984 World Int. Prop. O. .

Primary Examiner—Andrew V. Kundrat
Attorney, Agent, or Firm—Beveridge, DeGrandi & Weilacher

[57] ABSTRACT

A connector releasably connects two building elements (6, 7), one (7) of which has an engageable edge (8) and the other (6) has, at the connection end, a cavity (9). In the cavity, a first sleeve (2) of the same cross-sectional shape as the cavity is insertable therein. The sleeve has a longitudinal hole (10) for receiving an elongate clamping member (1) which includes, at its outer end, a hook (18) for engagement with the engageable edge. The part of the clamping member received in the longitudinal hole has a bevelled surface (16) to cooperate with a clamping screw (4) which, when turned, is movable transversely of the clamping member to a position with its tip against the bevelled surface under spring bias between the first sleeve and the clamping member. The bevelled surface (16) is arranged in a transverse recess (15) in the clamping member (1). Into this recess, a second sleeve (3) having a threaded hole (14) for receiving the clamping screw (4) can be depressed, against the spring bias, to a position in which the second sleeve (3) is located completely inside the circumference of the first sleeve (2).

7 Claims, 1 Drawing Sheet

CONNECTOR

BACKGROUND OF THE INVENTION

The present invention relates to a connector for releasably connecting two building elements wherein one of elements has an engageable edge and the other has, at the connection end, a cavity in which a first sleeve of the same cross-sectional shape as the cavity is insertable, such first sleeve having a longitudinal hole for receiving an elongate clamping member. The clamping member comprises, at its outer end, a hook for engagement with the engageable edge and, on its part received in the first hole, a bevelled surface to cooperate with a clamping screw which, when turned in a threaded hole in a second sleeve, is movable transversely of the clamping member to a position with its tip against the bevelled surface, under the action of a spring bias between the first sleeve and the clamping member.

This type of connector has been known and widely used for connecting building elements, such as tubular components, for instance tubular sections formed by extrusion of aluminum. Such connectors are, however, inconvenient in one or several respects because mounting them is complicated and because they consist of many parts and, inadvertently, they may come apart during handling.

CH-A-No. 525,346, SE-C-No. 329,904 and SE-C-No. 7903736-2 disclose different connectors of the type mentioned above which, however, all have the disadvantage that they cannot be mounted as a unit in the building elements. This makes mounting complicated and time-consuming.

Although SE-A-No. 8205298-6 discloses a connector which allows mounting as a unit, this connector is inconvenient to use since the clamping screw must be turned to fix the connector to the building element in which the connector is inserted, and since the clamping screw proper comes into engagement with the edge of an opening in the same building element so as to absorb the force clamping the building elements, when the connector is tightened.

SUMMARY OF THE INVENTION

The object of the present invention is to provide a connector which is insertable as a unit in one of the building elements and requires no turning of the clamping screw to be fixed relative thereto and, further, has no engagement between the clamping screw and the edge of the opening in the same building element.

According to the invention, this object is achieved in that the bevelled surface of the clamping member is arranged in a transverse recess therein, in which the second sleeve can be depressed, against the action of the spring bias, to a position in which the second sleeve is located completely inside of the first sleeve.

The second sleeve preferably comprises, at its end facing the clamping member, a flange for engagement with an internal edge of the first sleeve under the action of the spring bias. In this manner, the second sleeve is prevented from falling out of the first sleeve, before the connector is inserted in the cavity of one of the building elements.

Furthermore, the recess of the clamping member is in the direction of the inner end of the clamping member, preferably defined by a shoulder spaced from the bevelled surface. The height of the shoulder is then smaller than the distance from the base of the recess to the second sleeve end facing the clamping member, when the flange of the second sleeve engages with the internal edge. This eliminates the risk that the clamping member can be ejected from the first sleeve by the spring bias, if the clamping screw, upon dismantling of the building elements, is unscrewed to the extent that its tip disengages from the bevelled surface.

The second sleeve may have a circular cross-section because the contact pressure between the sleeve and the edge of the opening in the building element is sufficient to prevent rotation of the second sleeve when the clamping screw is turned therein. The circular cross-sectional shape greatly facilitates the manufacture of both the first and the second sleeve. For the same purpose, the longitudinal hole of the first sleeve and the part of the clamping member received therein may have one and the same circular cross-sectional shape.

Finally, the clamping member may be provided, between the hook and the part received in the first sleeve, with a flange having the same cross-sectional shape as the first sleeve. In this case, a compression spring can be arranged between the flange and the first sleeve. The flange, having the same cross-sectional shape as the first sleeve, makes it easier to guide the clamping member relative to the building element in which it is mounted.

BRIEF DESCRIPTION OF THE DRAWINGS

The invention will now be described in greater detail below with reference to the accompanying drawing in which.

DETAILED DESCRIPTION OF THE PREFERRED EMBODIMENT

Figure 1:
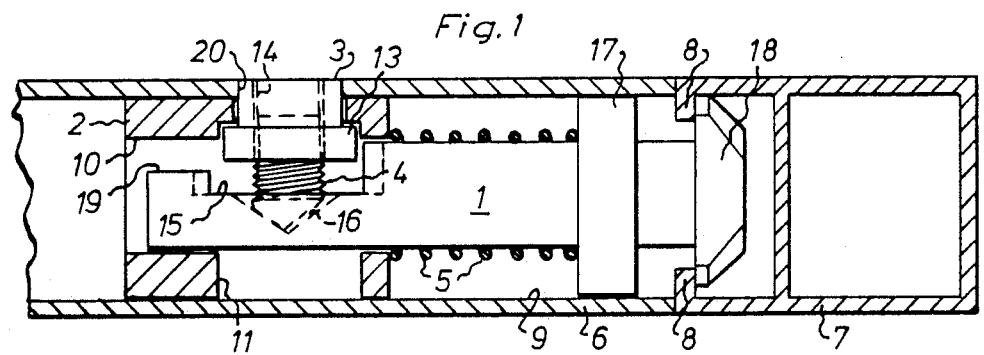
FIG. 1 is a cross-section of two tubular sections joined by the connector according to the present invention.
Figure 2:
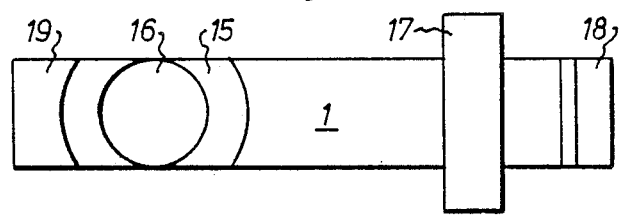
FIG. 2 is a plan view of the clamping member of the connector shown in FIG. 1.
Figure 3:
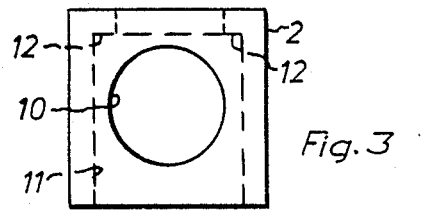
FIG. 3 is a front view of one of the sleeves shown in longitudinal section in FIG. 1.

The preferred embodiment of the connector according to the present invention as illustrated in FIG. 1, comprises a clamping member 1, a guide sleeve 2, a locking sleeve 3, a clamping screw 4 and a helical compression spring 5. The connector is mounted in a square tube 6 which is connected with a tubular section 7 by means of the connector. The connector can be used generally for releasably connecting two building elements, of which one has an engageable edge, such as the edge 8 on the tubular section 7, and the other has, at the connection end, a cavity corresponding to the cavity 9 in the square tube 6. The guide sleeve 2 has the same cross-sectional shape as cavity 9 of the tube 6 and is thus insertable in this cavity. The guide sleeve 2 further has a longitudinal hole 10 for receiving the elongate clamping member 1. The hole 10 is preferably circular in cross-section, as shown in FIG. 3, and the clamping member has, along the main portion of its length, the same cross-sectional shape as the hole 10 and is thus insertable therein. The guide sleeve 2 further has a second through hole 11 which is directed perpendicular to the longitudinal axis of the hole 10. Also, the hole 11 preferably is of circular cross-section and further is recessed at one end such that an internal edge 12 is formed.

In the hole 11 of the guide sleeve 2, the locking sleeve 3 is insertable and can be retained by engagement between a flange 13 and the internal edge 12. The locking sleeve 3 which also is circular in cross-section, has a central threaded hole 14 for receiving the clamping screw 4. The flange 13 has approximately the same diameter as the hole 11, while the diameter of the locking sleeve 3 otherwise corresponds to the smaller diameter of the hole 11 adjacent the edge 12.

A recess 15 is formed in the clamping member 1 transversely of the longitudinal axis thereof. The locking sleeve 3 is receivable within the recess 15 in such a position that the locking sleeve 3 is located completely inside the circumference of the guide sleeve 2 when the locking sleeve 3 and the clamping member 1 are mounted in the guide sleeve 2.

The base of the recess 15 is provided with a bevelled surface having a conical shape. When the clamping screw 4 is fastened in the locking sleeve 3, the tip of the clamping screw 4 comes into engagement with the bevelled surface 16 since the compression spring 5 tends to move the clamping member 1 out of the guide sleeve 2. More precisely, the compression spring 5 is arranged between the guide sleeve 2 and a flange 17 on the clamping member 1, which is positioned between the recess 15 and a hook 18 at the outer end of the clamping member 1. The flange 17 preferably has the same cross-sectional shape as the guide sleeve 2 and this improves the guiding of the clamping member 1 relative to the tube 6.

A shoulder 19 is formed at the clamping member inner end adjacent the recess 15 and the spaced from the bevelled surface 16. The height of the shoulder 19 is smaller than the distance from the base of the recess 15 to the locking sleeve end facing the clamping member 1, when the flange 13 of the locking sleeve 3 engages with the internal edge 12 of the guide sleeve 2.

The connector described above is assembled in the following member. First, the locking sleeve 3 is inserted in the guide sleeve 2 to the position shown in FIG. 1. Preferably, the clamping screw 4 already has been screwed into the locking sleeve to the extent that its tip projects only slightly beyond the inner end of the locking sleeve 3. Subsequently, the compression spring 5 is mounted on the clamping member 1, and the end of the clamping member provided with the shoulder is inserted in the hole 10 of the guide sleeve 2 to the position shown in FIG. 1, whereupon the clamping screw 4 is advanced to against the bevelled surface 16 in the recess 15. Thus, the clamping member 1 is retained in the guide sleeve 10, and the connector is ready for mounting in e.g. the tube 6. Now the guide sleeve end facing away from the hook 18 is inserted into the cavity 9 of the square tube 6 until the locking sleeve side edge comes into engagement with the end of the tube 6. By simultaneously depressing the locking sleeve 3 and the clamping member 1 against the action of the compression spring 5, the locking sleeve 3 comes to a position in the guide sleeve 2 where it is located completely inside of the guide sleeve 2. Thus, the connector can be pushed further in the cavity 9 of the tube 6, up to a position in which the locking sleeve 3 is located immediately below a corresponding opening 20 in one wall of the tube 6. The spring bias pushes the locking sleeve 3 upwardly in the opening 20 and thus fixes the connector in the tube 6.

To connect the tube 6 with the tube 7, the hook 18 on the clamping member 1 is moved behind the engageable edges 8 of the tube 7 whereupon the clamping screw 4 is screwed down in the locking sleeve 3. By cooperation with the bevelled surface 16, the clamping screw 4 pulls the clamping member 1 into the tube 6 against the action of the compression spring 5, until the tubes 6 and 7 are securely joined.

To disconnect the tubes 6 and 7 from each other, the clamping screw 4 is unscrewed whereby the compression spring moves the clamping member 1 a distance out of the tube 6 such that the tube 7 can be released from the hook 18. If the clamping screw 4 should be unscrewed to the extent that it disengages from the bevelled surface 16, the shoulder 19 prevents the clamping member 1 from being ejected at the end of the tube 6 by the action of the compression spring 5.

The connector according to the invention also can be removed from the pipe 6 as a unit. The locking sleeve 3 with the clamping screw 4 suitably positioned can be pressed down through the opening 20 until the locking sleeve 3 is located completely inside the circumference of the guide sleeve 2. the entire connector can then be pulled out of the tube 6 as a unit without risk that its components will separate even after removal.

I claim:

1. A connector for releasably connecting a first building element to a second building element, the first building element including an engageable edge and the second including a connection end having a cavity, said connector comprising:
    a first sleeve having the same cross-sectional shape as the cavity so as to be insertable therein, said first sleeve having a longitudinal hole,
    an elongate clamping member provided to be receivable within said longitudinal hole, said clamping member comprising, at an outer end portion thereof, a hook formed for engagement with the engageable edge and, on a portion thereof received in said first hole, a bevelled surface,
    a second sleeve having a threaded hole, and
    a clamping screw which, when turned in said threaded hole in said second sleeve, is movable transversely of said clamping member to a position with the tip of said screw against said bevelled surface under spring bias between said first sleeve and said clamping member, said bevelled surface being provided in a transverse recess in said clamping member, said second sleeve being depressable into said transverse recess against the spring bias to a position in which said second sleeve is located completely inside of said first sleeve.

2. A connector as claimed in claim 1, wherein said second sleeve comprises, at its end facing said clamping member, a flange for engaging an internal edge of said first sleeve under said spring bias.

3. A connector as claimed in claim 2, wherein said clamping member comprises a shoulder at its end portion opposite said hook, said shoulder being spaced from said bevelled surface and defining said transverse recess.

4. A connector as claimed in claim 3, wherein the height of said shoulder is less than the distance from the base of said transverse recess to said end of said second sleeve which faces said clamping member when said flange of said second sleeve engages with said internal edge.

5. A connector as claimed in claim 1, wherein said second sleeve has a circular cross-section.

6. A connector as claimed in claim 1, wherein said longitudinal hole of said first sleeve and said portion of said clamping member received therein have the same circular cross-sectional shape.

7. A connector as claimed in claim 1, wherein said clamping member is provided, between said hook and said portion received in said first sleeve, with a flange having the same cross-sectional shape as said first sleeve, and a compression spring is arranged between said flange and said first sleeve to provide said spring bias.

* * * * *